United States Patent [19]

Little

[11] 4,279,463
[45] Jul. 21, 1981

[54] COMBINATION SUN-MOON FILTER

[76] Inventor: Robert T. Little, 160 Columbia Heights, Brooklyn, N.Y. 11201

[21] Appl. No.: 73,549

[22] Filed: Sep. 7, 1979

[51] Int. Cl.³ .......................... G02B 23/00; G02B 5/22
[52] U.S. Cl. ........................................ 350/17; 350/316
[58] Field of Search ..................... 350/17, 8, 316, 318, 350/315, 314, 311, 1.2, 1.7, 276 R

[56] References Cited

U.S. PATENT DOCUMENTS

| 2,379,153 | 6/1945 | Holste | 350/17 |
| 2,953,970 | 9/1960 | Maynard | 350/58 |
| 3,351,408 | 11/1967 | Krewalk | 350/318 |
| 3,870,403 | 3/1975 | Ward | 350/276 R |
| 3,897,140 | 7/1975 | Tuthill | 350/314 |
| 4,027,943 | 6/1977 | Everett | 350/17 |
| 4,165,919 | 8/1979 | Little | 350/17 |

Primary Examiner—Jon W. Henry

[57] ABSTRACT

A combination sun-moon filter employs a first filter that is mounted at the front of the telescope and a second that is mounted in the telescope near the eyepiece. Each filter transmits approximately one percent of the light that strikes it, and both filters together reduce the amount of light leaving the viewing opening of the telescope to a value low enough for comfortable solar viewing. To convert to lunar viewing, it is only necessary to remove the front filter, and the remaining filter reduces light intensity enough for comfortable viewing of a bright moon.

16 Claims, 7 Drawing Figures

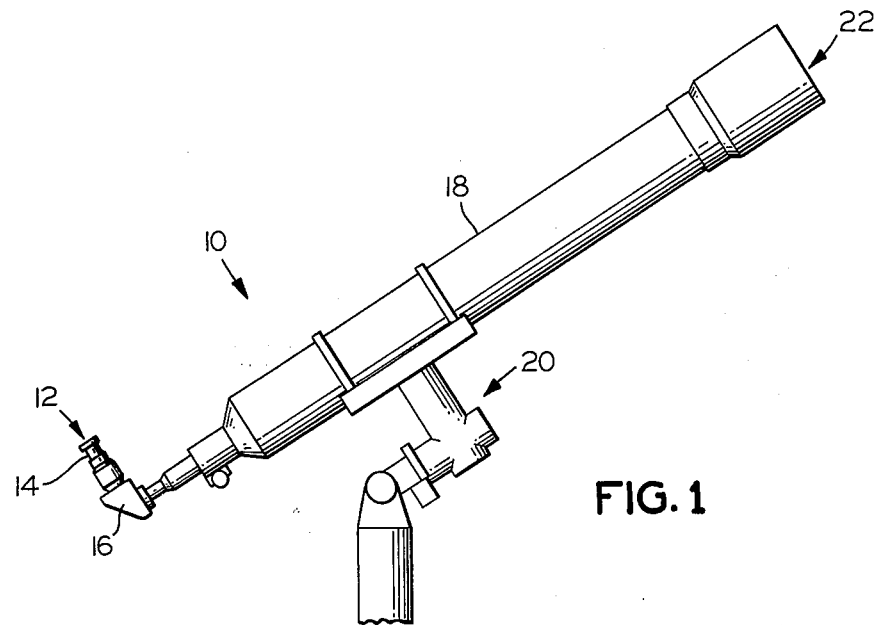
FIG. 1
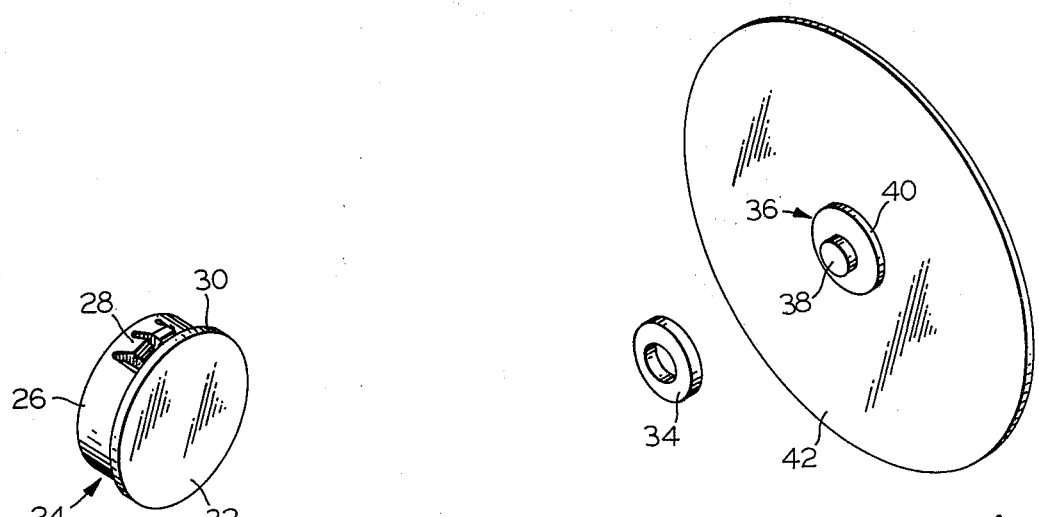
FIG. 6
FIG. 2

COMBINATION SUN-MOON FILTER

BACKGROUND OF THE INVENTION

The present invention relates to optical filters for telescopes, specifically those used for viewing the sun and the moon.

It is common knowledge that direct viewing of the midday sun with the naked eye can be damaging to the eye, and this is particularly true when the sun is viewed through a telescope. Telescopic solar viewing therefore requires the use of filters to block out all but a very small fraction of the light reaching the telescope from the sun. Viewing of a bright moon through a telescope can also be uncomfortable, and moon filters are therefore often employed.

From the point of view of the accuracy of the telescope system, it is best that the filter be positioned near to the eyepiece, or at least after the objective, so that the image will have been formed before any errors resulting from the filter are introduced. As a result, filters are sometimes positioned just inside the eyepiece. However, solar filters are frequently positioned at the front of the telescope so that the interior of the telescope will be shielded from the bulk of the solar radiation. This avoids the internal heating that would otherwise result, but the heating is avoided at the expense of accuracy because any distortion caused by the filter occurs before the focusing and image forming of the telescope.

The object of the present invention is to permit easy conversion from sun viewing to moon viewing and back again. A further object is to accomplish this in an assembly that fulfills the purpose of avoiding solar heating of the telescope interior while minimizing the effect of any distortions introduced by the filter.

SUMMARY OF THE INVENTION

The foregoing and related objects are achieved in an improvement in a telescope having a front opening, a viewing opening, and an objective for focusing light rays traveling from the front opening to the viewing opening. The improvement includes a first optical filter removably mounted on the telescope substantially at the front opening. The first filter passes only a portion of the light rays that strike it. A second optical filter is removably mounted on the telescope so that light rays traveling from the objective to the viewing opening pass through it. The second filter also passes only a portion of the light rays that strike it, and the first and second filters together reduce the light intensity to a first predetermined percentage suited to reducing the intensity of the sun's rays to a comfortable level. The second filter reduces the light intensity to a second predetermined percentage suited to reducing the intensity of the moon's rays to a comfortable level when the first filter is removed from the telescope. Conversion from sun viewing to moon viewing is thereby possible by removal of the first optical filter.

The first and second optical filters can conveniently include first and second sheets, respectively, of a synthetic organic material, each sheet having a metallic coating covering its surface, and the metallic coating can include a layer of aluminum. In the preferred embodiment, the sheets of synthetic organic material consist essentially of polyethylene terephthalate. It is recommended that the sheets of synthetic organic material be less than about 0.05 mm thick.

Typical first and second optical filters include first and second support means, respectively, on which the sheets are mounted, the support means including mounting means for removably mounting the support means to the telescope.

When the telescope includes a mirror mount mounted in the telescope centrally of the front opening, the first support means typically includes a generally circular peripheral portion, a hub portion disposed centrally of the peripheral portion, and strut portions extending from the hub portion to the peripheral portion to join it thereto. The sheet is attached at its edge to the peripheral portion of the support, and the hub is removably mounted on the mirror mount at the front opening of the telescope. A permanent magnet may be mounted on the mirror mount, and the hub portion of the first support means may include magnetically susceptible material magnetically attracted to the permanent magnet to hold the hub in place on the mirror mount.

The telescope will include a tubular portion positioned for passage therethrough of light rays traveling from the objective to the viewing opening. The second filter support can include a generally cylindrical member received in the tubular portion of the telescope.

The first predetermined percentage should be less than about 0.1%, and the second predetermined percentage should be between about 0.1% and about 10%. The first optical filter should reduce the light intensity to a third predetermined percentage between about 0.1% and about 10%. The second and third predetermined percentages can conveniently be made to be essentially equal.

The following description teaches a method of changing from solar to lunar telescopic viewing that includes the steps of providing a telescope and first and second filters as previously described, removing the first filter, and viewing the moon through the telescope.

There is also taught a method of changing from lunar to solar telescopic viewing that includes the step of providing a telescope as previously described and a first optical filter removably mounted on the telescope so that light rays traveling from the objective to the viewing opening pass through it, the filter reducing the light intensity to a first predetermined percentage suited to reducing the intensity of the moon's rays to a comfortable level. The method further includes mounting a second optical filter on the telescope substantially at the front opening, the second filter and the first-mentioned filter together reduce the light intensity to a second predetermined percentage suited to reducing the intensity of the sun's rays to a comfortable level, and viewing the sun through the telescope.

A combination sun-moon filter kit also achieves the objects of the invention when used with a telescope having a front opening, a viewing opening, and an objective for focusing light rays traveling from the front opening to the viewing opening. The kit includes a first optical filter that has a first filter sheet passing only a portion of the light rays that strike it, the first optical filter further including first support means on which the first sheet is mounted. The support means includes means for removably mounting the first support means substantially at the front opening of the telescope. The kit also includes a second optical filter including a second filter sheet passing only a portion of the light rays that strike it. The second optical filter further includes second support means on which the second filter sheet is mounted. The second support means include means for removably mounting it on the telescope so that light rays traveling from the objective to the viewing opening pass through the second filter sheet. The first and second filters together reduce the light intensity to a first predetermined percentage suited to reducing the intensity of the sun's ray to a comfortable level. The second filter alone reduces the light intensity to a second predetermined percentage suited to reducing the intensity of the moon's rays to a comfortable level. Mounting of the second optical filter by the second mounting means on the telescope so that light rays traveling from the objective to the viewing opening pass through the filter sheet thereby permits comfortable viewing of the moon through the telescope, and subsequent mounting of the first optical filter substantially at the front end of the telescope by the first mounting means without removing the second optical filter thereby permits comfortable viewing of the sun through the telescope.

BRIEF DESCRIPTION OF THE DRAWINGS

These and further features and advantages of the present invention are described in connection with the accompanying drawings, in which:

FIG. 1 is a side elevation of a typical telescope without the combination sun-moon filter of the present invention;

FIG. 2 is a perspective view of the first filter of the present invention as seen from the rear;

FIG. 6 is a perspective view of the second filter of the present invention; and

DETAILED DESCRIPTION OF THE PREFERRED EMBODIMENT

Figure 7:
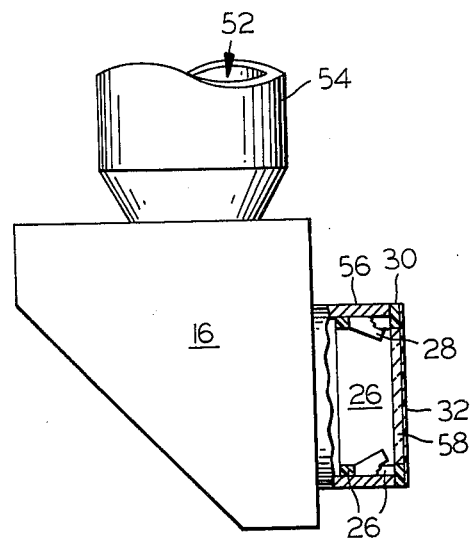
FIG. 7 is a side elevation, partly in section, of a prism assembly with the second filter of the present invention attached.

FIG. 1 illustrates an exemplary telescope 10 of the type in which the filters of the present invention can be employed. The external configuration of FIG. 1 suggests that telescope 10 is a refractor, but those skilled in the art will appreciate as the description progresses that the principles of the present invention can be employed in any type of telescope.

Telescope 10 is of conventional design, having a telescope tube 18 mounted on suitable mounting apparatus 20. At the front end of the telescope is a front opening 22 through which light is received that travels down tube 18 and ultimately passes out of the telescope at the viewing opening 12. Between the front opening 22 and the viewing opening 12, the light is suitably focused in such a way as to magnify the image seen by the viewer. A prism assembly 16 is provided so that the viewer may look in a direction perpendicular to the axis of telescope tube 18, but those skilled in the art will recognize that the use of a prism 16 is not required. It is only necessary that a telescope tube 18 be provided and that suitable optics interior to the telescope properly focus the image for viewing. In a refractor telescope, the optics would include at least an objective near the front of the telescope for focusing the light entering front opening 22. In refractors the objective is a lens, but the objective in a reflector would typically be a spherical mirror positioned near the end opposite the front opening. Whether the objective is a lens or mirror, its function is the same; all light entering the front opening 22 at a given angle is focused to a single point, and light entering at a different angle is focused to a different point. The light is the telescope continues past the focal plane defined by the points of focus and would typically be received by further lenses or mirrors. However, in the simplest case of a telescope used for photography, the telescope optics could consist of nothing more than the objective. Whatever the configuration of the telescope may be, the arrangement of the present invention employs a first filter at the front end and a second filter positioned in the optical path somewhere after the objective.

Figure 4:
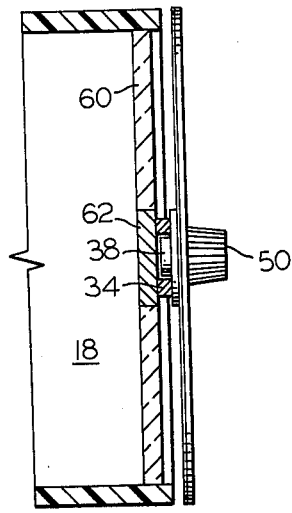
FIG. 4 is a simplified axial section of the front of a telescope on which the first filter is attached.
Figure 3:
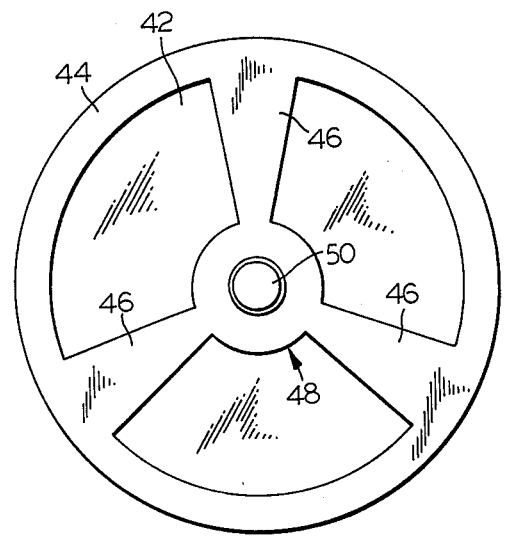
FIG. 3 is a front elevation of the first filter of the present invention.

FIGS. 2, 3, and 4 illustrate one embodiment of the first filter of the present invention. The operative feature of the filter is a filter sheet 42 of some type of synthetic organic material, preferably a polyester such as polyethylene terephthalate. The sheet should be quite thin; in the preferred embodiment, the thickness is approximately one-hundredth of a millimeter, although sheets as thick as five-hundredths of a millimeter or more could be employed. However, thicker sheets add more refraction distance and more possibility for distortion, so sheets in the suggested range are preferred.

The side of sheet 42 shown in FIG. 3 is coated with a thin layer of aluminum. The layer is deposited to a thickness such that it will reflect all but about one percent of the light striking the filter. Of course, filters employing the teachings of the present invention may well reflect different amounts; the determining factor, as will be seen below, is whether the first and second filters in combination reduce the amount of light sufficiently for comfortable viewing of the sun, and filters individually transmitting on the order of one percent of the light achieve this result. Aluminum coatings with sheet resistivities in the range of one-half to five ohms per square have been employed for such purposes.

Sheet 42 is mounted, as seen in FIG. 4, on a support including an annular portion 44 concentric with a hub portion 48 and attached to it by means of strut portions 46 extending from the hub portion to the annular portion. As FIG. 3 shows, hub portion 48 has a knob 50 extending from the front side and adapted for convenient grasping by the user. The other side of the hub includes a relatively wide disc-shaped portion 40 made of a magnetically susceptible material and a boss 38 extending from its center. A ring magnet 34 is provided with an opening in which boss 38 can be received.

FIG. 4 shows the first filter in an arrangement adapted for use on reflector telescopes having a mirror mount 62 disposed centrally of the front opening. Mirror mount 62 is disposed in the center of a glass piece 60, which may be merely a flat glass plate in some types of telescopes. In others, member 60 could be a corrector plate. In any event, disc magnet 34 is appropriately attached by cement or some other means to mirror mount 62. Disc magnet 62 is intended to remain in position relatively permanently; it remains even when the first filter is removed.

For normal solar viewing, central boss 38 is received centrally of disc magnet 34, which attracts the magnetically susceptible material in the hub of the filter support. Under ordinary conditions, this is sufficient to hold the first filter in place. By grasping knob 50, removal of the first filter is a relatively simple matter. Under windy conditions, it is advisable to provide some assistance, by any appropriate means, to hold the filter in place, the most reliable means being to attach it to the telescope about its periphery.

Figure 5:
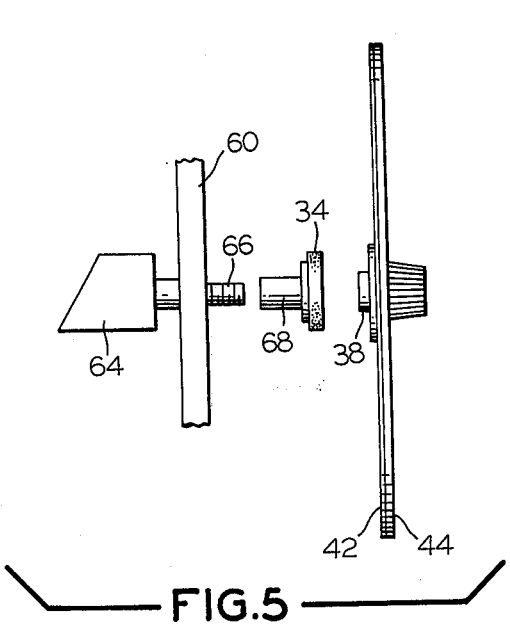
FIG. 5 is a simplified side elevation with parts removed of the front of an alternate type of telescope to which the first filter of the present invention is to be attached.

An alternate for mounting magnet 34 is illustrated in FIG. 5, which portrays a secondary mirror 64 mounted at the front portion of another type of reflector. It is common in this type of telescope to have a threaded rod 66 extending forwardly from the front of the telescope. On such telescopes a T-nut 68 could be attached to ring magnet 34 so that the combination can be threaded on to the front of the telescope. The first filter would then be attached as before.

FIG. 6 is a perspective view of the second filter of the present invention. The first and second filters are used together for solar viewing, and their combined effect is required to reduce the intensity of solar light rays to a comfortable level. In the preferred embodiment, the second filter includes a filter sheet 32 made of the same material as that out of which sheet 42 is made. Of course, it is not necessary that the materials or the fraction of light that they transmit be the same, but this is a convenient arrangement. Like the first filter, the second filter transmits one percent of the light that strikes it, so the first and second filters together only permit 0.01% of the light from the sun to pass out the viewing opening. (Solar filters that permit somewhat more or less than 0.01% of the light to pass through can also be effective, but it is recommended that no more than about a tenth of a percent of the light be transmitted through the viewing opening.)

Sheet 32 is mounted on a generally cylindrical support 26 that has a lip 30 formed about the end to which sheet 32 is attached. The generally cylindrical portion 26 has protruding tabs 28 formed in it for a purpose illustrated in FIG. 7. In FIG. 7, second filter 24 is mounted in a horizontal tubular portion of the telescope extending horizontally from prism assembly 16. Tabs 28 are free at their ends near lips 30, and they are forced inwardly as the second filter is inserted into tubular portion 56. The resultant outward force applied by the tabs effect a snug fit of filter 24 in tubular portion 56. When second filter 24 has been inserted to the desired distance, lip portion 30 of second filter 24 abuts the edge of tubular portion 56.

As is well known in the art, prism 16 bends light traveling generally horizontally in FIG. 7 so that it adopts a generally vertical path. Ordinarily, an eyepiece such as eyepiece 12 (FIG. 1) is provided whose diameter is such as to fit within opening 52 of a tubular portion 54 extending vertically from prism assembly 16. The inner diameter of tubular portion 54 is slightly greater than the outer diameter of tubular portion 56 so that an eyepiece whose outer diameter is the same as that of horizontal tubular portion 56 can be either substituted for prism assembly 16 or fitted into vertical tubular portion 54. It is thus apparent that second filter 24 could alternately be positioned on such an eyepiece. This is not ordinarily the preferred arrangement if the prism is being used, because the arrangement shown in FIG. 7 permits changing of eyepieces without removal of the filter. However, if no prism assembly such as prism assembly 16 is used, second filter 24 would have to be inserted into the eyepiece.

It should also be pointed out that photographs are sometimes taken through a telescope without the use of an eyepiece. This type of photography is not illustrated in the drawings, but it can be appreciated by reference to FIG. 7 that tubular portion 56 is intended to be inserted into another tubular portion of the telescope having an inner diameter equal to that of tubular portion 54. The opening to such a portion becomes the viewing opening when eyepieces and prisms are removed, and second filter 24 should be inserted into that opening if solar photography is to be undertaken without eyepieces. Lunar photography can be performed without filters.

Some colar correction may be desired in filters of this type in order, for instance, to restore the sun to its normal color. For ordinary amateur astronomical purposes, the color is not particular important, but it will be appreciated that most viewers would prefer to see the sun in the color with which they are familiar. Accordingly, colored glass may be provided in the second filter to restore the sunlight to its customery color. Ordinarily, the filter sheets 32 and 42 would be dyed a copper color to reduce to some extent the coloring resulting from the presence of the aluminum coating. It has been found desirable in such cases to add an orange-colored glass disc 58 in the second filter 24. The resulting solar image has the expected color.

When the sun is to be viewed, both filters are mounted on the telescope as illustrated in the drawings. Since each filter reduces the light intensity by about 99%, the resulting intensity of the sun's rays as they leave viewing opening 12 is on the order of one-hundredth of a percent of that which would otherwise result. Both filters transmit equal percentages of the light that strikes them, but the first filter effects the overwhelming majority of the light removal in absolute terms. Accordingly, the amount of solar radiation that is admitted into the telescope is only one percent of that which would be admitted if the filtering were totally performed at the eyepiece end. As a result, heating of the telescope is greatly reduced. On the other hand, only half of the total thickness of the metal film is present on the first filter, so only half of the distortion introduced by the filter system occurs ahead of the objective; the remainder of whatever distortion is introduced occurs after the objective, where it will have less effect. Accordingly, telescope heating is largely avoided during solar viewing without introducing all of the filter distortion ahead of the objective.

When it is desired to switch from solar to lunar viewing, it is not necessary to remove a sun filter and then attach a moon filter. All that is required is that the front filter be removed by merely grasping knob 50 and pulling the front filter off permanent magnet 34. The one percent transmission afforded by the remaining second filter 24 is suited to comfortable viewing of a bright moon. Conversely, when conversion from lunar to solar viewing is desired, removal of a lunar filter is not necessary; it is only necessary to attach the sun filter in the manner illustrated in FIG. 4.

It will be apparent to those skilled in the art that a variety of modifications of the preferred embodiment can be exployed without departing from the teachings of the present invention. For example, the division of filtering between the first and second filters can easily be different from that illustrated in the preferred embodiment. If it is thought that the telescope will tolerate more heating than is permitted with the first filter of the illustrated embodiment, the metal coating on the first filter could be made, say, half as thick as that in the illustrated embodiment. The coating on the second filter could then be made half again as thick, and the same amount of total filtering would result, but the distortion introduced by the filters would be concentrated even more after the objective, where its effect is less. Changes in the way that the filters are attached will also be obvious to those skilled in the art. For example, it may not be desired in certain telescopes to mount the front filter centrally. It would then, of course, be a simple matter to attach them peripherally. Changes in other aspects of the preferred embodiment that would still result in a device following the teachings of the present invention will also be apparent to those skilled in the art.

Having thus described the invention, I claim:

1. In a telescope having a front opening, a viewing opening, and an objective for focusing light rays traveling from said front opening to said viewing opening, the improvement comprising:
   a. a first optical filter removably mounted on said telescope substantially at said front opening, said first filter passing only a portion of the light rays that strike it; and
   b. a second optical filter removably mounted on said telescope so that light rays traveling from said objective to said viewing opening pass therethrough, said filter passing only a portion of the light rays that strike it, said first and second filters together reducing the light intensity to a first predetermined percentage suited to reducing the intensity of the sun's rays to a comfortable level, said second filter reducing the light intensity to a second predetermined percentage suited to reducing the intensity of the moon's rays to a comfortable level when said first filter is removed from said telescope, conversion from sun viewing to moon viewing thereby being possible by removal of said first optical filter.

2. The telescope improvement of claim 1 in which said first and second optical filters include first and second sheets, respectively, of a synthetic organic material, each sheet having a metallic coating covering its surface.

3. The telescope improvement of claim 2 wherein said metallic coating includes a layer of aluminum.

4. The telescope improvement of claim 2 wherein said sheets of synthetic organic material consist essentially of polyethylene terephthalate.

5. The telescope improvement of claim 4 wherein said sheets of synthetic organic material are less than about 0.05 mm thick.

6. The telescope improvement of claim 2 wherein said first and second optical filters include first and second support means, respectively, on which said sheets are mounted, said support means including mounting means for removably mounting said support means to said telescope.

7. The telescope improvement of claim 6 wherein said telescope includes a mirror mount mounted in said telescope centrally of said front opening and wherein said first support means includes a generally circular peripheral portion, a hub portion disposed centrally of said peripheral portion, and strut portions extending from said hub portion to said peripheral portion to join it thereto, said sheet being attached at the edge thereof to said peripheral portion of said support, said hub being removably mounted on said mirror mount at said front opening of said telescope.

8. The telescope improvement of claim 7 further including a permanent magnet mounted on said mirror mount and wherein said hub portion of said first support means includes magnetically susceptible material magnetically attracted to said permanent magnet to hold said hub in place on said mirror mount.

9. The improvement of claim 6 wherein said telescope includes a tubular portion positioned for passage therethrough of light rays traveling from said objective to said viewing opening and wherein said second filter support includes a generally cylindrical member received in said tubular portion of said telescope.

10. The telescope improvement of claim 1 wherein said first predetermined percentage is less than about 0.1%.

11. The telescope improvement of claim 10 wherein said second predetermined percentage is between about 0.1% and about 10%.

12. The telescope improvement of claim 11 wherein said first optical filter reduces the light intensity to a third predetermined percentage between about 0.1% and about 10%.

13. The telescope improvement of claim 12 wherein said second and third predetermined percentages are essentially equal.

14. A method of changing from solar to lunar telescopic viewing comprising the steps of:
   a. providing a telescope having a front opening, a viewing opening, an objective for focusing light rays traveling from said front opening to said viewing opening, a first optical filter removably mounted on said telescope substantially at said front opening, said first filter passing only a portion of the light rays that strike it, and a second optical filter removably mounted on said telescope so that light rays traveling from said objective to said viewing opening pass therethrough, said filter passing only a portion of the light rays that strike it, said first and second filters together reducing the light intensity to a first predetermined percentage suited to reducing the intensity of the sun's rays to a comfortable level, said second filter reducing the light intensity to a second predetermined percentage suited to reducing the intensity of the moon's rays to a comfortable level when said first filter is removed from said telescope;
   b. removing said first filter; and
   c. viewing the moon through said telescope.

15. A method of changing from lunar to solar telescopic viewing comprising the steps of:
   a. providing a telescope having a front opening, a viewing opening, an objective for focusing light rays traveling from said front opening to said viewing opening, and a first optical filter removably mounted on said telescope so that light rays traveling from said objective to said viewing opening pass therethrough, said filter reducing the light intensity to a first predetermined percentage suited to reducing the intensity of the moon's rays to a comfortable level;
   b. mounting a second optical filter on said telescope substantially at said front opening, said second filter and said first-mentioned filter together reducing the light intensity to a second predetermined percentage suited to reducing the intensity of the sun's rays to a comfortable level; and
   c. viewing the sun through said telescope.

16. A combination sun-moon filter kit for use with a telescope having a front opening, a viewing opening, and an objective for focusing light rays traveling from said front opening to said viewing opening, comprising:
  a. a first optical filter including a first filter sheet passing only a portion of the light rays that strike it, said first optical filter further including first support means on which said first sheet is mounted, said support means including means for removably mounting said first support means substantially at the front opening of the telescope; and
  b. a second optical filter including a second filter sheet passing only a portion of the light rays that strike it, said second optical filter further including second support means on which said second filter sheet is mounted, said second support means including means for removably mounting said second support means on said telescope so that light rays traveling from said objective to said viewing opening pass through said second filter sheet, said first and second filters together reducing the light intensity to a first predetermined percentage suited to reducing the intensity of the sun's rays to a comfortable level, said second filter alone reducing the light intensity to a second predetermined percentage suited to reducing the intensity of the moon's rays to a comfortable level, whereby said second optical filter may be mounted by said second mounting means on the telescope so that light rays traveling from said objective to said viewing opening pass through said filter sheet to permit comfortable viewing of the moon through the telescope, and whereby said first optical filter may be subsequently mounted substantially at the front end of the telescope by said first mounting means without removing said second optical filter to permit comfortable viewing of the sun through the telescope.

* * * * *